April 25, 1967   J. W. ELDRED   3,315,782
ARTICLE CONVEYING APPARATUS
Filed Oct. 1, 1965   4 Sheets-Sheet 4
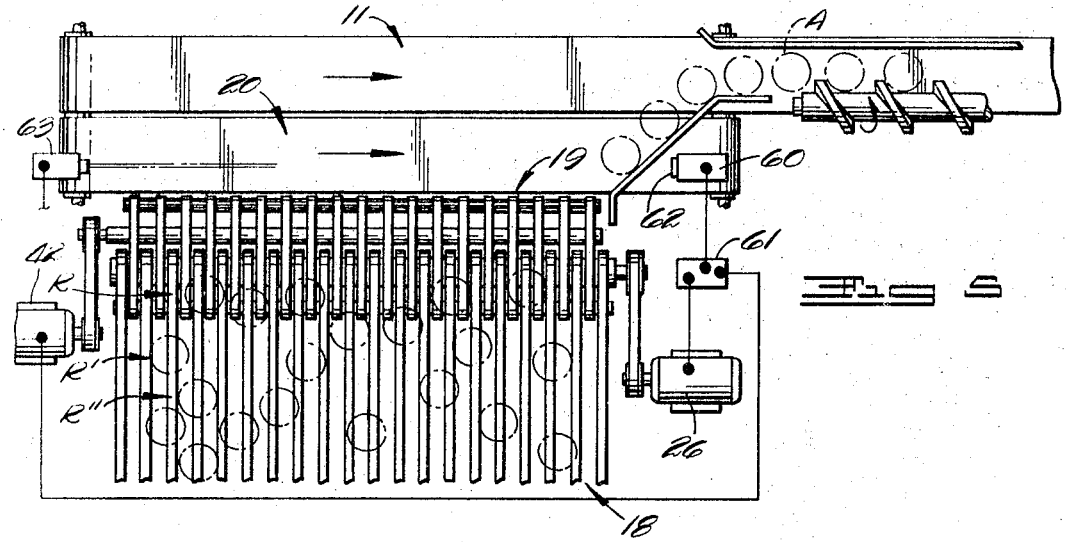
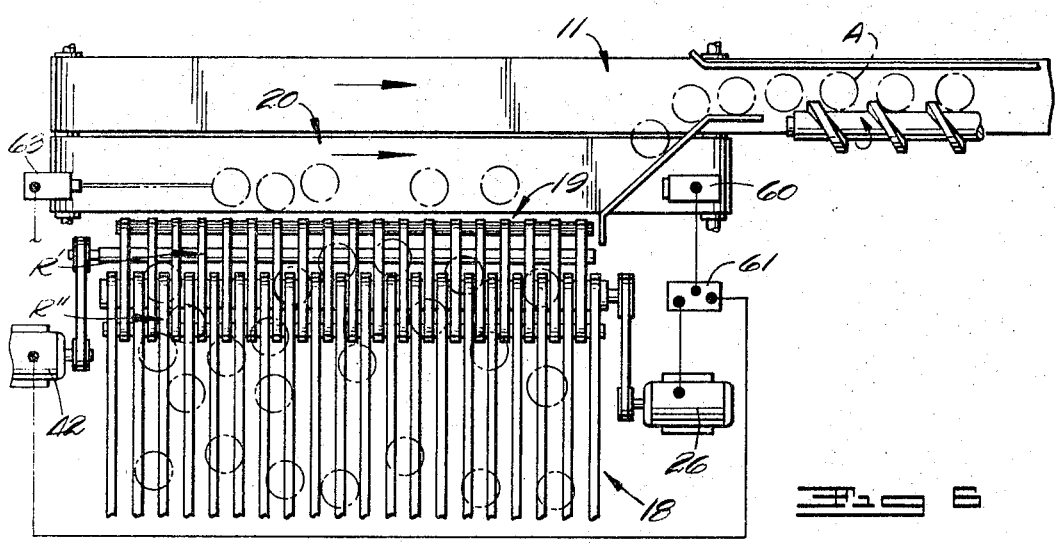
INVENTOR.
JOHN W. ELDRED
BY
MAHONEY, MILLER & RAMBO
BY
ATTORNEYS United States Patent Office 3,315,782
Patented Apr. 25, 1967

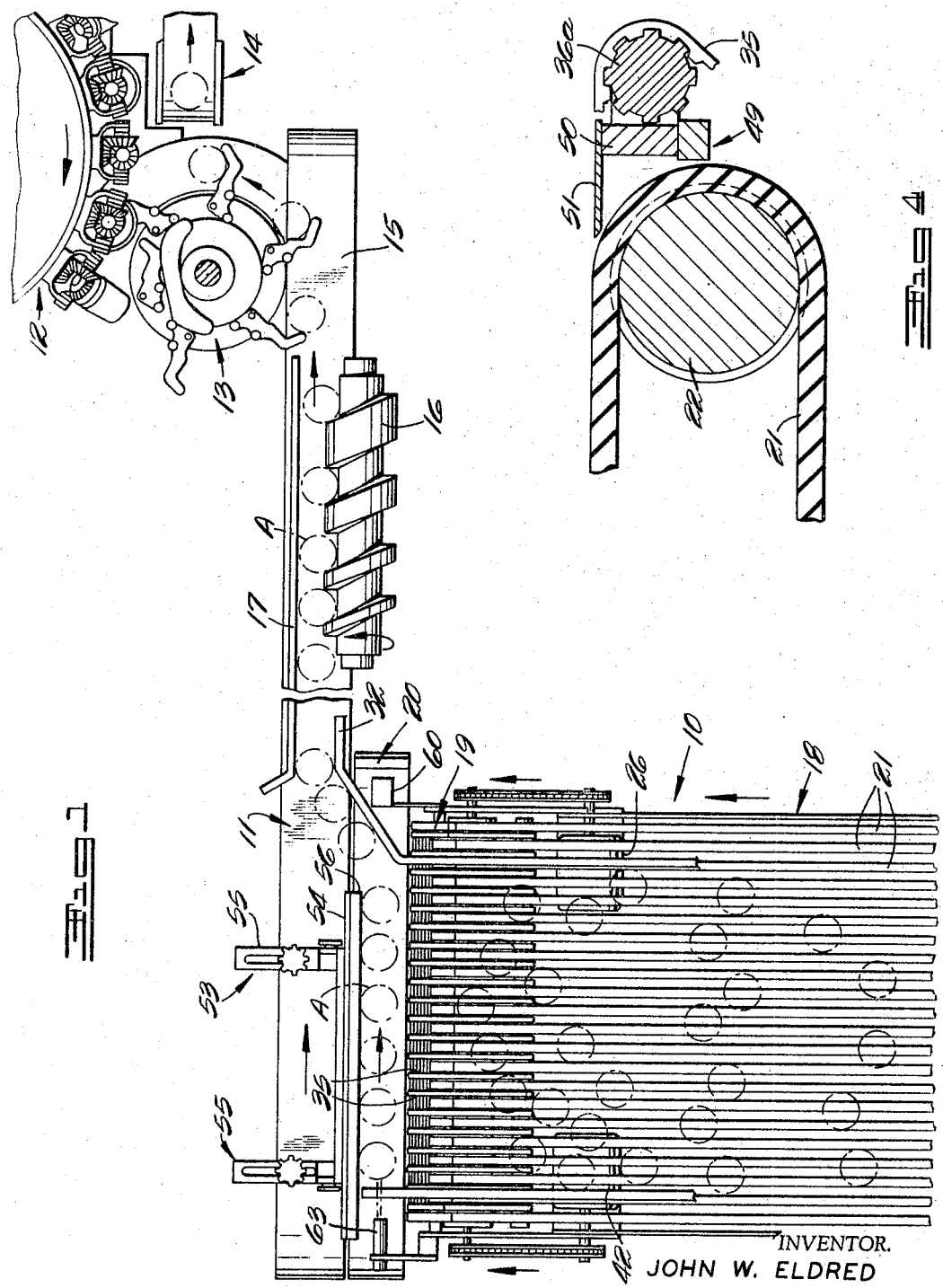

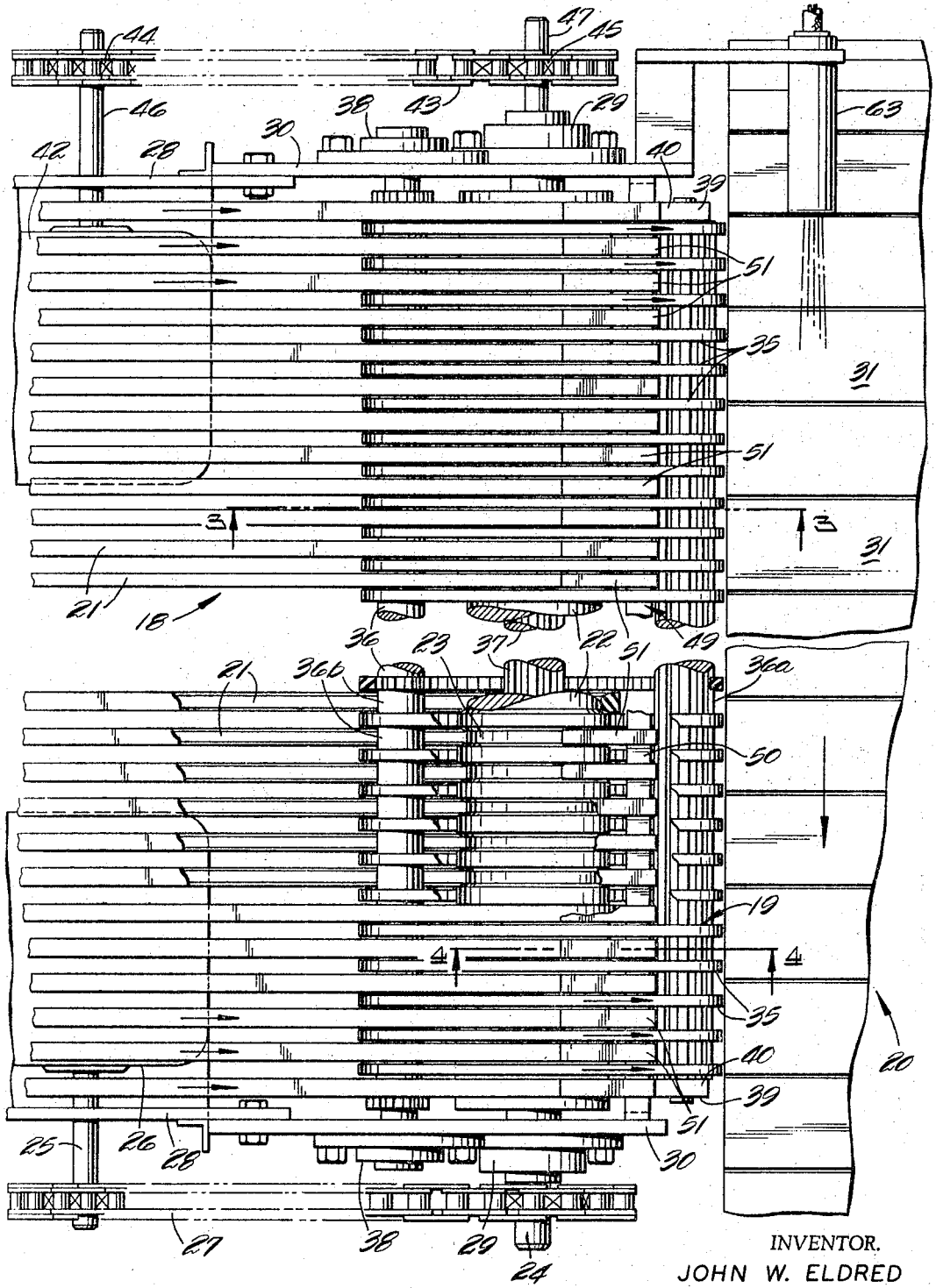

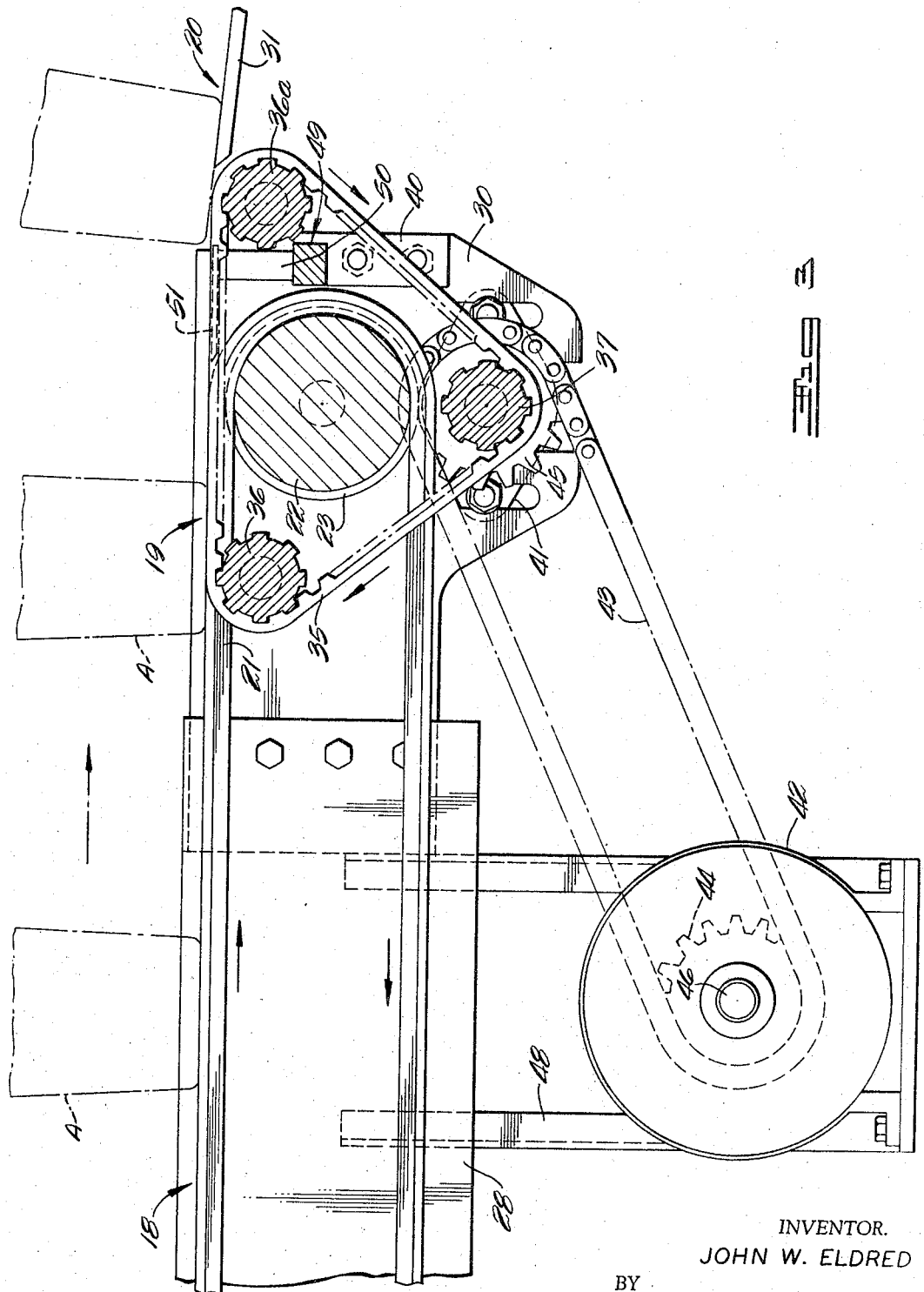

3,315,782
ARTICLE CONVEYING APPARATUS
John W. Eldred, Columbus, Ohio, assignor to The Eldred Company, Columbus, Ohio, a corporation of Ohio
Filed Oct. 1, 1965, Ser. No. 492,186
5 Claims. (Cl. 198—32)

This invention relates, in general, to article conveying apparatus. It relates, more specifically, to conveyor apparatus for receiving articles in an indiscriminate sequence and discharging the articles in longitudinally aligned groups.

For the purpose of clearly illustrating the utilization of the conveyor apparatus of this invention, the apparatus is shown and described in association with a glassware decorating machine such as is the subject of the patent issued to John W. Eldred and James B. Legg, No. 3,176,824, issued Apr. 6, 1965. However, the conveyor apparatus may be utilized in the handling of other articles in association with other types of machines. In a machine of the type illustrated, the articles on which the machine is intended to operate must be fed in a straight-line, uniformly spaced relationship to assure a smooth, uninterrupted work flow. This objective is difficult to achieve since the articles are received indiscriminately from a source of supply such as an article forming machine or transporting container. Feeding of the articles to the decorating machine thus requires a surge table which arranges the articles in a straight line relationship which facilitates subsequent longitudinal spacing of the articles. The surge table comprises a conveyor apparatus which transports the articles from a receiving station and arranges the articles in a straight line or longitudinally aligned relationship for subsequent transfer to a longitudinal spacing conveyor which ultimately transports the articles to a loading station of the decorating machine.

It is the primary object of this invention to provide a conveyor apparatus which may be advantageously utilized as a surge table in the feeding of articles in straight line relationship onto a longitudinal spacing and feed conveyor. The conveyor apparatus serves as a receiving station for the articles which are indiscriminately positioned on the surface thereof for transport and alignment. Movement of the articles on the surge table is determined by the discharge of the articles onto the longitudinal spacing conveyor to prevent jamming of the articles and interruption of the flow of articles to the decorating machine. As a body of indiscriminately positioned articles traverse the surge table, the conveyor apparatus of this invention operates to separate the foremost articles from the body of articles and arrange the articles thus separated into a straight line group for subsequent placement on the longitudinal spacing conveyor.

In the drawings:

FIGURE 1 is a plan view of an article conveying apparatus embodying this invention and is illustrated in association with a glassware decorating machine.

FIGURE 2 is a fragmentary, enlarged plan view of the conveying apparatus having portions thereof removed to expose underlying components.

FIGURE 3 is a vertical sectional view taken along line 3—3 of FIGURE 2.

FIGURE 4 is a vertical sectional view taken along line 4—4 of FIGURE 2.

FIGURE 5 is a diagrammatic plan view of the conveyor apparatus separating a group of articles from the main body of articles.

FIGURE 6 is a diagrammatic plan view of the conveyor apparatus discharging a separated group of articles onto a longitudinal spacing conveyor.

Having reference to the drawings, an embodiment of the conveyor apparatus of this invention, designated generally by the numeral 10, is shown disposed in operative association with a longitudinal spacing conveyor 11. The longitudinal spacing conveyor 11 forms a part of the input feeding system for a glassware decorating machine, indicated at 12. As previously indicated, the conveyor apparatus 10 of this invention in the illustrated embodiment is designed for feeding glassware in longitudinally aligned relationship to the decorating machine 12. The longitudinal spacing conveyor 11 receives the substantially longitudinally aligned articles, shown in broken lines in the several figures and designated by the letter A, and operates on the articles to successively space the articles longitudinally for proper reception by the decorating machine. After the articles are longitudinally spaced on the conveyor 11, the articles are sequentially removed from the endless belt of the conveyor 11 by an unloader mechanism 13. The unloader mechanism 13 positioned at a receiving station of the decorating machine 12 transfers the articles into operative relationship with the decorating machine. Upon completion of the decorating operation, the articles are removed from the decorating machine 12 by an unloading conveyor 14. The longitudinal spacing conveyor 11 comprises an endless belt 15 and the screw feeder 16 which are continuously operated in the indicated direction. The articles being carried by the belt 15 are brought into engagement with the screw feeder 16 which is designed to longitudinally space successive articles on the belt 15 as the belt 15 is revolved. An elongated stop or guide rail 17 is supported above the endless belt 15 in spaced parallel relationship to the screw feeder 16 to assure engagement of the articles with the screw feeder. The longitudinal spacing conveyor 11 and associated glassware decorating machine 12 and unloader mechanism 13 may be of the type illustrated in the previously cited patent of John W. Eldred and James B. Legg, No. 3,176,824, issued Apr. 6, 1965. However, the specific application of the conveyor apparatus of this invention is not to be considered as limited to utilization with articles such as glassware or being limited to utilization with the illustrated type of longitudinal spacing conveyor and associated apparatus.

The conveyor apparatus 10 of this invention forms a surge table comprising three elements which operate on the articles, which are received in an indiscriminately arranged pattern, to discharge the articles in longitudinally aligned groups. The three major structural components of the conveyor apparatus 10 are a supply conveyor 18, a transfer conveyor 19, and a discharge conveyor 20 which are selectively operable to perform the separating and discharge functions.

The supply conveyor 18 is formed by a multiplicity of endless belts 21 (FIGURES 1 to 4) of specific length and are supported in a vertical plane by a pair of longitudinally spaced drum rollers 22. Preferably the supply conveyor belts 21 are of the V-type and the rollers 22 are appropriately grooved as at 23 to receive the belts. One of the rollers 22 illustrated in the several figures of the drawing also forms a driving roller for the supply conveyor belts and a driving connection is provided between a shaft extension 24 (FIGURE 2) of the roller and an output shaft 25 of a drive motor 26. The drive motor 26 may be of the electrically operated type. A sprocket chain 27 trained about a sprocket gear mounted on each of the shafts 24 and 25 forms the driving connection. A rigid frame assembly 28 which includes the longitudinally extending extension brackets 30 at each side of the conveyor belts 21 provides the necessary support for the rollers 22. The shaft extensions 24 of the rollers are journaled in bearing assemblies 29 secured to the frame extension brackets 30. The supply conveyor 18 is normally supported with the upper run of the belts disposed in a substantially horizontal plane and with the upper run of each of the belts 21 disposed in a common plane forming a surface for receiving and supporting the articles thereon. Driving the supply conveyor belts 21 in the indicated direction places the discharge end of the conveyor at the illustrated drum roller 22. For stable support of the articles during transport on the supply conveyor, the endless belts 21 preferably have a width to spacing relationship such that an article will be supported by at least two of the belts regardless of its relative position on the conveyor surface.

Supported in spaced relationship to the discharge end of the supply conveyor 18 is the discharge conveyor 20 (FIGURES 2 and 3). The discharge conveyor 20 is also of the endless belt type comprising a number of interconnected flights 31 which are trained about suitable supporting sprockets or rollers which are not shown in the illustrated figures. The length of the discharge conveyor 20 is greater than the width of the supply conveyor 18 and it is disposed transversely to the direction of travel of the supply conveyor. Although the discharge conveyor 20 is disposed longitudinally in substantially the same plane as the supply conveyor, the surface formed by the upper run thereof is transversely inclined as best shown in FIGURE 3. The longitudinal edge of the discharge conveyor adjacent the supply conveyor is at a relatively greater elevation than the opposite longitudinal edge. This transverse inclination of the upper run of the discharge conveyor 20 assures that the articles transferred onto the discharge conveyor will be displaced inwardly of the receiving longitudinal edge.

Referring to FIGURE 1, it will be seen that the discharge conveyor 20 is disposed in parallel extending relationship to the longitudinal spacing conveyor 11 with the lowermost discharge edge of the upper run contiguous with the upper run of the longitudinal spacing conveyor. The articles carried by the discharge conveyor will thus be readily transferred from the surface of the discharge conveyor onto the upper run of the spacing conveyor 11. Since the discharge conveyor 20 is driven in the same direction as the spacing conveyor 11 and is physically disposed in close relationship thereto, the drive for the discharge conveyor may be obtained from the drive of the longitudinal spacing conveyor 11 by means of a suitable mechanical connection or driven by independent means (not shown). The discharge conveyor 20 may be revolved at the same speed as the spacing conveyor 11 but is preferably operated at a slightly faster speed. Deflection of the articles from the discharge conveyor 20 onto the longitudinal spacing conveyor 11 is effected by means of a guide rail 31 disposed a distance vertically above the discharge conveyor. The guide rail 32 comprises an elongated, cylindrical rod supported above the discharge conveyor in angularly displaced relationship to the longitudinal axis of this conveyor. Referring to FIGURE 1, it can be seen that the guide rail 32 will urge the articles coming in contact therewith from the discharge conveyor 20 onto the spacing conveyor 11. If desired, this guide rail may also project longitudinally over the surface of the supply conveyor 18 and thereby form a marginal protective rail for the articles being transported by the supply conveyor.

Interposed between the supply conveyor 18 and the discharge conveyor 20 is a transfer conveyor 19 (FIGURE 1) for effecting displacement of the articles from the supply conveyor onto the discharge conveyor and separating the leading or foremost articles from the main body of articles carried by the supply conveyor. In accordance with this invention, the transfer conveyor 19 (FIGURES 2 and 3) comprises a multiplicity of endless belts 35 which are trained about a pair of idler rollers 36 and 36a and a drive roller 37 that support them in vertical parallel planes axially of the rollers. The idler and drive rollers 36, 36a and 37 are carried by the frame extensions 30 of the rigid frame assembly which also supports the drum roller 22 for the supply conveyor. Each of the rollers of the transfer conveyor are disposed substantially horizontally and extend transversely relative to the supply conveyor with their axes in spaced parallel relationship. The two idler rollers 36, 36a are supported by bearing assemblies 38 and 39, respectively, which are secured to the frame extension 30 so as to position the idler rollers on opposite sides of the drum roller 22. The bearing assembly 39 for the idler rollers 36a disposed adjacent the discharge conveyor 20 is secured to the frame extension 30 by means of an auxiliary bracket 40 (FIGURE 2) which is secured to the frame extension bracket 30. Each end of the drive roller 37 is journaled in a bearing assembly 41 which is secured to the frame extension bracket 30 by means of bolt and slot connections (FIGURE 3) to provide adjustability of the tension of the endless bolts 35. The two idler rollers 36, 36a are positioned at opposite sides of the drum roller 22 and support an upper run of the transfer conveyor belts 35 slightly above the upper surface of the roller 22. Both idler rollers 36, 36a are relatively positioned to support the upper run of the transfer conveyor 19 formed by the belts 35 in a substantially horizontal plane in contiguous relationship to the upper run of the supply conveyor 18. Thus, as is clear from FIGURES 2 and 3, the endless belts 35 forming the transfer conveyor 19 are interleaved with the belts 21 of the supply conveyor 18 and the portions thereof forming the upper run are horizontal and contiguous to the surface of the supply conveyor 18. Articles being transported by the supply conveyor 18 are thus received by the transfer conveyor 19 and displaced forwardly by this conveyor. This action of the transfer conveyor 19 readily removes the articles from the supply conveyor and the subsequent movement of the articles will, therefore, be controlled by the transfer conveyor.

The drive roller 37 of the transfer conveyor 19 is positioned beneath the drum roller 22 of the supply conveyor and maintains the endless belts of the transfer conveyor clear of the drum roller 22. As can be best seen in FIGURE 3, the drive roller 37 forms a triangle with the idler rollers 36, 36a and is positioned beneath the lower run of the belts 21 of the supply conveyor 18. Rotation of the drive roller 37 for revolving the belts of the transfer conveyor is effected by means of a drive motor 42 which may comprise a conventional or variable speed electric motor. The drive motor 42 is mechanically connected to the drive roller 37 by means of a chain 43 which is trained about the sprocket gears 44 and 45 which are mounted on the output shaft 46 of the drive motor 42 and the shaft extension 47 of the drive roller 37, respectively. A supporting bracket 48 secured to the rigid frame assembly 28 and depending therefrom suspends the drive motor 42 beneath the supply conveyor.

The endless belts 35 forming the transfer conveyor 19 are preferably of a smaller overall size than the belts 21 forming the supply conveyor 18 thus permitting the idler rollers 36 and 36a to be of a relatively smaller diameter than the drum roller 22 of the supply conveyor. The smaller radius of curvature of the belts 35 at the terminal ends of the transfer conveyor substantially reduces the spacing required between the exterior supporting surface of the belts forming the conveyor and the adjacent receiving edge of the following conveyor such as the discharge conveyor 20. This smaller radius of curvature enhances the smooth transition of the articles carried thereby onto the succeeding conveyor which is the discharge conveyor 20 in this instance. Since the transfer conveyor belts 35 are smaller than the supply conveyor belts 21, the idler roller 36 extending beneath the supply conveyor belts is provided with spaced grooves 36b to permit passage of the supply conveyor belts 21 across the idler roller without interference. The grooves 36b thus permit the upper run of the transfer conveyor 19 to be supported with the surface thereof contiguous to the article supporting surface of the supply conveyor 18. To assure a positive drive with the utilization of small diameter rollers such as the drive roller 37, the drive roller is formed with a number of gear teeth or splines and the belts 35 are of the gear-tooth type for positive tractive engagement. The two idler rollers 36, 36a are also provided with similarly toothed surfaces for engaging the gear teeth of the belts 35.

To assist the transfer conveyor operation of the transfer conveyor belts 35, a transfer bracket assembly 49 (FIGURES 2 and 3) is provided in association with the transfer conveyor 19. The transfer bracket assembly 49 includes a transversely extending transfer bar 50 which is carried by the frame extension brackets 30 and is connected thereto by means of the auxiliary brackets 40. The transfer bar 50 (FIGURE 4) extends upwardly toward the upper run of the transfer conveyor belts terminating in a surface disposed immediately adjacent the lower or inner face of the gear teeth of the belts 35. Secured to the upper surface of the transfer bar in transversely spaced relationship therealong are a number of support fingers 51 which project from the transfer bar toward the drum roller 22 with one of such support fingers being interposed between each pair of transfer conveyor forming belts 35. Each supoprt finger 51 extends rearwardly toward an endless belt 21 of the supply conveyor and forms a supported extension thereof. The fingers 51 which project toward the drum roller 22 will thus assist the transfer conveyor belts 35 by providing additional support for the articles being transferred.

In the operation of the conveyor apparatus, both the supply conveyor 18 and the transfer conveyor 19 are simultaneously operated to transport the articles which are received by the supply conveyor onto the discharge conveyor 20. The forward motion of the articles as they are carried by the transfer conveyor 19 onto the discharge conveyor 20 and coupled with the downward inclination of the surface of the discharge conveyor induces the articles to traverse the surface of the discharge conveyor. To assure that the articles thus transferred to the discharge conveyor 20 will not overshoot the conveyor and become broken or otherwise jam the apparatus, a back-up or stop plate 53 is provided (FIGURE 1). The stop plate assembly 53 comprises an elongated, vertically disposed plate 54 which extends longitudinally of the discharge conveyor immediately adjacent and above the lowermost longitudinal edge thereof. The plate 54 is mounted on the supporting framework of the spacing conveyor 11 by means of a pair of adjustable bracket assemblies 55. The adjustable bracket assemblies permit proper positioning of the stop plate 54 relative to the discharge conveyor 20. The prevent damage to the articles should the articles engage the stop plate 54, the vertical surface of the plate is faced with a resilient cushioning material 56 which is formed in a sheet and secured thereto.

The speed of operation of the machine or apparatus utilizing the articles, which is the glassware decorating machine 12 in this instance, determines the speed or rate at which the articles may be fed to the machine. The spacing conveyor 11 operates at a speed which, in conjunction with the screw feeder 16, assures that the articles carried by the spacing conveyor 11 will reach the loader 13 in properly spaced sequence and at the desired rate. Thus, to assure that a constant supply of articles are transferred to the spacing conveyor 11, the supply, transfer and discharge conveyors are operated in a manner which will transport the articles in a continuous flow. As previously indicated, the articles are positioned indiscriminately on the surface of the supply conveyor 18 and their rapid, indiscriminate transfer to the spacing conveyor 11 would result in a jamming at the entrance to the spacing conveyor 11 and particularly along the guide rail 32 as it approaches the stop rail 17.

Accordingly, it is desired that the articles be removed from the main body of articles being fed by the supply conveyor in groups which are longitudinally aligned and may be subsequently transferred onto the spacing conveyor 11 in a sequential manner. When a longitudinally aligned group of articles is supported on the discharge conveyor 20, as indicated in FIGURE 1, it is essential that the supply and transfer conveyors 18 and 19 be stopped to prevent further transfer of articles onto the discharge conveyor until the initial group has been removed and positioned on the spacing conveyor 11. A control system is thus provided to control the operation of the drive motors 26 and 42 which respectively operate the supply conveyor 18 and the transfer conveyor 19. This control system is responsive to the presence of articles on the discharge conveyor 20 and operates to energize the motors 26 and 42 and includes an electrically operated detector 60 which is connected to an electric circuit controller 61. The controller 61 is also electrically connected to the drive motors 26 and 42 and is operative to control the energization of the motors through connection of each drive motor to a suitable electrical power source. The detector 60 is also connected to a power source. In the illustrated embodiment, the detector 60 comprises a photoelectric system including a photoelectric cell 62 and a source of illumination which may be an electric lamp 63. The electric lamp 63 and the photoelectric cell 62 are positioned above the upper run of the discharge conveyor 20 at the opposite ends thereof whereby the presence of an article on the discharge conveyor will interrupt the beam of light transmitted by the lamp 63 to the photoelectric cell and thereby control the operation of the system. The operation of this control system is such that as an article is positioned on the discharge conveyor, the light beam from the lamp 63 is interrupted and the detector 60 will operate to open the controller and deenergize the drive motors 26 and 42. Thus, the drive motors 26 and 42 will stop and the conveyors 18 and 19 will prevent further transfer of the articles onto the discharge conveyor as long as an article remains on the discharge conveyor and in interrupting relationship to the controlling beam of light. However, as soon as the last article will be removed from the discharge conveyor, the detector 60 will operate to again energize the motors 26 and 42 and continue the operation of the supply conveyor 18 and the transfer conveyor 19 to transfer additional articles onto the discharge conveyor. Although the detector 60 has been described as comprising a photoelectric system, it is also contemplated that an electronically operated system utilizing ultrasonic signals may be readily substituted for the illustrated system. The advantage of the ultrasonic system is that such a system would not be affected by ambient light conditions.

In addition to the function of transferring the articles from the supply conveyor 18 onto the discharge conveyor 20, the transfer conveyor 19 must also separate a leading, substantially longitudinally aligned group of articles from the main body of articles carried by the supply conveyor. This is accomplished by revolving the transfer conveyor belts 35 at a relatively greater speed than and independently of the belts 21 of the supply conveyor. The desired speed of operation of the transfer conveyor belts is obtained through appropriate selection of the drive motor 42 and the mechanical drive connection components. Operation of the conveying apparatus in effecting the separation of the leading or foremost longitudinally aligned group of articles carried by the supply conveyor 18 is diagrammatically illustrated in FIGURES 5 and 6. In FIGURE 5, a group of articles are shown indiscriminately positioned on the supply conveyor forming a main body. It will be noted that of this main body of articles, several individual articles are positioned on the supply conveyor 18 immediately adjacent the receiving end of the transfer conveyor 19. As the supply conveyor continues to revolve, these articles will be picked up by the transfer conveyor 19 and transported toward the discharge conveyor 20. Since the transfer conveyor 19 is being revolved at a relatively faster rate than the supply conveyor 18, these articles, which are initially picked up by the transfer conveyor, will be displaced toward the discharge conveyor at a relatively greater rate and will thus be separated from the main body of articles carried by the supply conveyor. These articles will form a substantially longitudinally aligned group of articles indicated at the point R and will be transported to the discharge conveyor 20. Since the articles at point R will be transported at a greater rate than a succeeding group of articles which are longitudinally aligned as at point R', the leading group will be displaced further from the second group of articles at R' and will be transferred onto the discharge conveyor 20 prior to the time at which the succeeding group could reach this conveyor. Since the initial group will reach the conveyor 20 first, the electric light beam will be interrupted and stop the operation of the supply and transfer conveyors. This will then assure that this leading group of articles, which will be substantially longitudinally aligned on the discharge conveyor 20, will be completely positioned on the spacing conveyor 11 before the succeeding group will be transferred to the discharge conveyor. This operation will prevent jamming of the articles at the entrance to the spacing conveyor 11 as they are guided by the guide rail 32 onto the spacing conveyor.

After the first group of articles, those articles formerly at point R, has cleared the discharge conveyor 20, the light beam will actuate the detector to again energize the motors 26 and 42 and continue revolving the belts forming the respective conveyors. Thus, the second group of substantially longitudinally aligned articles which were formerly at point R' will be transferred by the transfer conveyor 19 onto the discharge conveyor 20. The operation will then repeat itself to further separate the articles in longitudinally aligned groups as they are fed by the supply conveyor 18 onto the transfer conveyor 19. The transfer of the second group of articles which were formerly at R' is diagrammatically illustrated in FIGURE 6 which also indicates a third group of articles which form a longitudinally aligned group of articles within the main body of articles carried by the supply conveyor 18 and appear at the point R". This third group of articles will also be subsequently separated from the main body of articles and transferred to the discharge conveyor 20 in a similar manner.

It will be readily apparent from the foregoing detailed description and the accompanying drawings that the conveyor apparatus provided by this invention assures the continuous, uninterrupted flow of articles in longitudinally aligned groups to the utilizing apparatus. Interpositioning of an independently driven transfer conveyor between a supply conveyor forming a surge table and a discharge conveyor which ultimately transmits the articles onto the conveyor transporting the articles to the utilizing machine assures the positive separation of the articles into substantially longitudinally aligned groups. The aligned groups are transferred to the discharge conveyor and the interruption of the operation of the supply and transfer conveyors effected by positioning of articles on the discharge conveyor assures that this longitudinally aligned group of articles will be transferred to the spacing conveyor prior to the transfer of additional articles into interfering relationship therewith. The construction of the transfer conveyor, including its drive which is independent of the speed of the supply conveyor, also assures the smooth transition of articles from the supply conveyor to the transfer conveyor and subsequently from the transfer conveyor onto the discharge conveyor. The separation of the articles into longitudinally aligned groups coupled with the smooth transitioning between the conveyors assures a smooth continuous flow of articles to the machine without hindrance through interference or jamming of the articles at any point during the transfer procedure.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A conveyor apparatus comprising a discharge conveyor including an endless conveyor belt and drive means connected therewith for revolving said conveyor belt in a given direction, said conveyor belt having an upper run forming an article supporting surface, a supply conveyor disposed at an angle to said discharge conveyor for displacing articles carried thereby in a direction transverse to the longitudinal axis of said discharge conveyor, said supply conveyor being formed by a multiplicity of spaced parallel, endless belts with each of said belts having an upper run disposed in a common plane forming an article supporting surface and a discharge end, and being supported by longitudinally spaced transverse drums including one disposed adjacent the discharge end, said endless belts having a width to spacing ratio such that the articles to be supported thereon will be in contacting engagement with at least two of said belts, said supply conveyor being supported with the discharge end thereof disposed in spaced relationship to an adjacent longitudinally extending edge of the upper run of said discharge conveyor, a transfer conveyor interposed between said supply conveyor and said discharge conveyor and bridging the space therebetween for transferring articles from said supply conveyor to said discharge conveyor, said transfer conveyor being formed by a multiplicity of spaced parallel, endless belts aligned with the longitudinal axis of said supply conveyor with each of said belts having an upper run disposed in a common plane forming an article supporting surface having respective receiving and discharge end portions, and being supported by longitudinally spaced transverse drums with the said drum at the discharge end of the supply conveyor being longitudinally intermediate the transfer conveyor drums, said transfer conveyor being supported with the receiving end portions of the belts interleaved with the belts of said supply conveyor at the discharge end thereof and with the surfaces formed by the upper runs of said supply and transfer conveyors forming a substantially continuous plane, and drive means mechanically coupled with said supply and transfer conveyors for revolving said conveyors in the same direction with the transfer conveyor being revolved at a relatively faster rate than said supply conveyor, said drive means comprising a drive means coupled to at least one of said support drums of the supply conveyor and an independent drive means coupled to at least one of the support drums of the transfer conveyor.

2. A conveyor apparatus according to claim 1 in which said drums for supporting the transfer conveyor are arranged in a pair with one of the drums disposed behind the intermediate supply conveyor support drum and the other being disposed in advance of it, said independent drive means for the transfer conveyor comprising a drive drum disposed below the said supply conveyor drum and about which said transfer conveyor belts pass, said drive drum and said transfer conveyor belts having interfitting positive drive portions.

3. A conveyor apparatus according to claim 2 in which the transfer conveyor support drum that is disposed behind said supply conveyor support drum is provided with grooves spaced therealong through which said upper runs of the supply conveyor belts pass.

4. A conveyor apparatus according to claim 3 including a plurality of transversely spaced support fingers disposed laterally between said spaced parallel transfer conveyor belts and longitudinally between said supply conveyor support drum at the discharge end and said transfer support drum located in advance thereof, said fingers being in substantially longitudinal alignment with the upper runs of said supply conveyor belts and having upper support surfaces at substantially the same level as the article supporting surfaces of said belts.

5. A conveyor apparatus according to claim 1 in which the drive means for the supply conveyor comprises an electric motor and the drive means for the transfer conveyor comprises an independent electric motor, and control means for said motors comprising a detecting system disposed in operative relationship with said discharge conveyor for detecting the presence of articles on said discharge conveyor and stopping said motors until the articles have been removed therefrom.

References Cited by the Examiner

UNITED STATES PATENTS

| 2,877,883 | 3/1959 | Lanham | 198—32 |
| 2,953,234 | 9/1960 | Abendschein | 198—110 X |
| 2,959,271 | 11/1960 | Adamson | 198—110 |
| 3,176,821 | 4/1965 | Eldred et al. | 198—20 |
| 3,187,874 | 6/1965 | Readel et al. | 198—30 |
| 3,232,411 | 1/1966 | Kulig | 198—32 XR |

FOREIGN PATENTS 1,324,669  3/1963  France.

EVON C. BLUNK, *Primary Examiner.*

R. J. HICKEY, *Assistant Examiner.*